(12) United States Patent
Luo

(10) Patent No.: US 6,847,144 B1
(45) Date of Patent: Jan. 25, 2005

(54) PERMANENT MAGNET ROTOR ASSEMBLY FOR INTERIOR PERMANENT MAGNET ELECTRIC MOTOR

(75) Inventor: Yin-Jao Luo, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/733,107

(22) Filed: Dec. 10, 2003

(51) Int. Cl.[7] .................. H02K 21/12; H02K 21/14; H02K 21/16; H02K 1/32

(52) U.S. Cl. ................. 310/156.49; 310/156.53

(58) Field of Search ............... 310/156.53, 156.56, 310/156.45, 156.48, 156.49, 216, 261

(56) References Cited

U.S. PATENT DOCUMENTS

| | | | | |
|---|---|---|---|---|
| 5,508,576 A | * | 4/1996 | Nagate et al. ......... | 310/156.54 |
| 6,133,662 A | * | 10/2000 | Matsunobu et al. ... | 310/156.53 |
| 6,340,857 B2 | * | 1/2002 | Nishiyama et al. .... | 310/156.53 |
| 6,369,480 B1 | * | 4/2002 | Nishiyama et al. .... | 310/156.53 |
| 6,462,451 B1 | * | 10/2002 | Kimura et al. ......... | 310/156.38 |
| 6,525,442 B2 | * | 2/2003 | Koharagi et al. ...... | 310/156.48 |
| 6,741,002 B2 | * | 5/2004 | Nishiyama et al. .... | 310/156.53 |

* cited by examiner

*Primary Examiner*—Tran Nguyen
(74) *Attorney, Agent, or Firm*—Pro-Techtor International Services

(57) ABSTRACT

A permanent magnet rotor for a brushless electric motor, comprising at least two main magnetic poles, disposed on a periphery of a rotor. Each opening angle A covers N/2 times the opening angle of each of the stator sections, with N being an odd number greater or equal to 3. A is required to be the nearest angle that is smaller than 360/P degrees, with P being the number of poles. Each of the main magnetic poles has a periphery with a central section R1 and two end sections R2 R1 has an opening angle A1. The opening angle A1 covers N/2 times the opening angle of each of the stator sections, with N being an odd number greater or equal to 3. A1 is required to be smaller than the opening angle A of each of the main magnetic poles of the rotor. Each of the main magnetic poles contains a dual-plate permanent magnet.

6 Claims, 7 Drawing Sheets

PERMANENT MAGNET ROTOR ASSEMBLY FOR INTERIOR PERMANENT MAGNET ELECTRIC MOTOR

FIELD OF THE INVENTION

The present invention relates to a rotor assembly for an electric motor, particularly to a permanent magnet rotor assembly for a brushless electric motor.

DESCRIPTION OF RELATED ART

Traction motors for electric vehicles are able to be taken high loads, yet are accommodated in small volumes. So there is no way to install larger motors. Furthermore, traction motor of electric vehicles requires high rotational speeds and is always with flux weakening control. Rotors that have interior permanent magnets structure have to be used. Within the limited install space and over heating consideration, how to keep the same cooper loss with higher output capability for traction motor is essential. Therefore it is very important for the design of interior permanent magnet traction motors to reduce the armature reaction field to increase the output torque. In the meantime, it is also important to reduce the cogging torque and the rotation vibration of traction motor.

As shown in FIG. 5, a conventional brushless motor, as taught in U.S. Pat. No. 5,844,344 "DC brushless motor having auxiliary salient poles", has a rotor 1, and a stator 2. A permanent magnet 4 with poles 3 and grooves 5 are placed on the rotor 1. When the rotor 1 is under heavy load, the magnetic field increases due to the reaction field, and by magnetic flux in the permanent magnet 4, the magnetic field thereof is weakened, resulting in diminished output torque. To reduce the reaction field in the permanent magnet, U.S. Pat. No. 6,047,460 "Method of producing a permanent magnet rotor" discloses, as shown in FIG. 6, a rotor 1a having a periphery 3a with incisions, so that gaps are formed that reduce the reaction field. However, this rotor is only suitable for unidirectional rotation, and magnetic flux is considerably reduced.

SUMMARY OF THE INVENTION

It is therefore an object of the present invention to provide a permanent magnet rotor assembly for a brushless electric motor suitable to drive an electric vehicle and to undergo high load. The rotor assembly also provides higher output torque at reduced cogging torque and has higher reluctance ratio.

The permanent magnet rotor for a brushless electric motor of the present invention comprises at least two main magnetic poles, disposed on a periphery of a rotor and a stator with a plurality of stator sections. Each opening angle A covers N/2 times the opening angle of each of the stator sections, with N being an odd number greater or equal to 3. A is required to be the nearest angle that is smaller than 360/P degrees, with P being the number of poles. Each of the main magnetic poles has a periphery with a central section R1 and two end sections R2. R1 has an opening angle A1. The opening angle A 1 covers N/2 times the opening angle of each of the stator sections, with N being an odd number greater or equal to 3. A1 is required to be smaller than the opening angle A of each of the main magnetic poles of the rotor. Each of the main magnetic poles contains a dual-plate permanent magnet. The permanent magnet has two near ends placed at the center of the main magnetic pole, forming outward protruding poles oriented parallel to outer edges of the permanent magnet.

The present invention takes advantage of an outer curvature of the sections R1, R2, of adapting the opening angles of each main magnetic pole and the opening angle of the section R1 thereof, and of the outward protruding poles of the dual-plate permanent magnets each being oriented parallel to outer edges of the permanent magnets to reduce the reaction field in stator coils, increase magnetic flux and increase output torque of the brushless motor, reducing cogging torque of the brushless motor and achieving a relatively large magnetic reluctance ratio. The rotor assembly of the present invention allows for bidirectional rotation.

The present invention can be more fully understood by reference to the following description and accompanying drawings.

DETAILED DESCRIPTION OF THE PREFERRED EMBODIMENT

Figure 1:
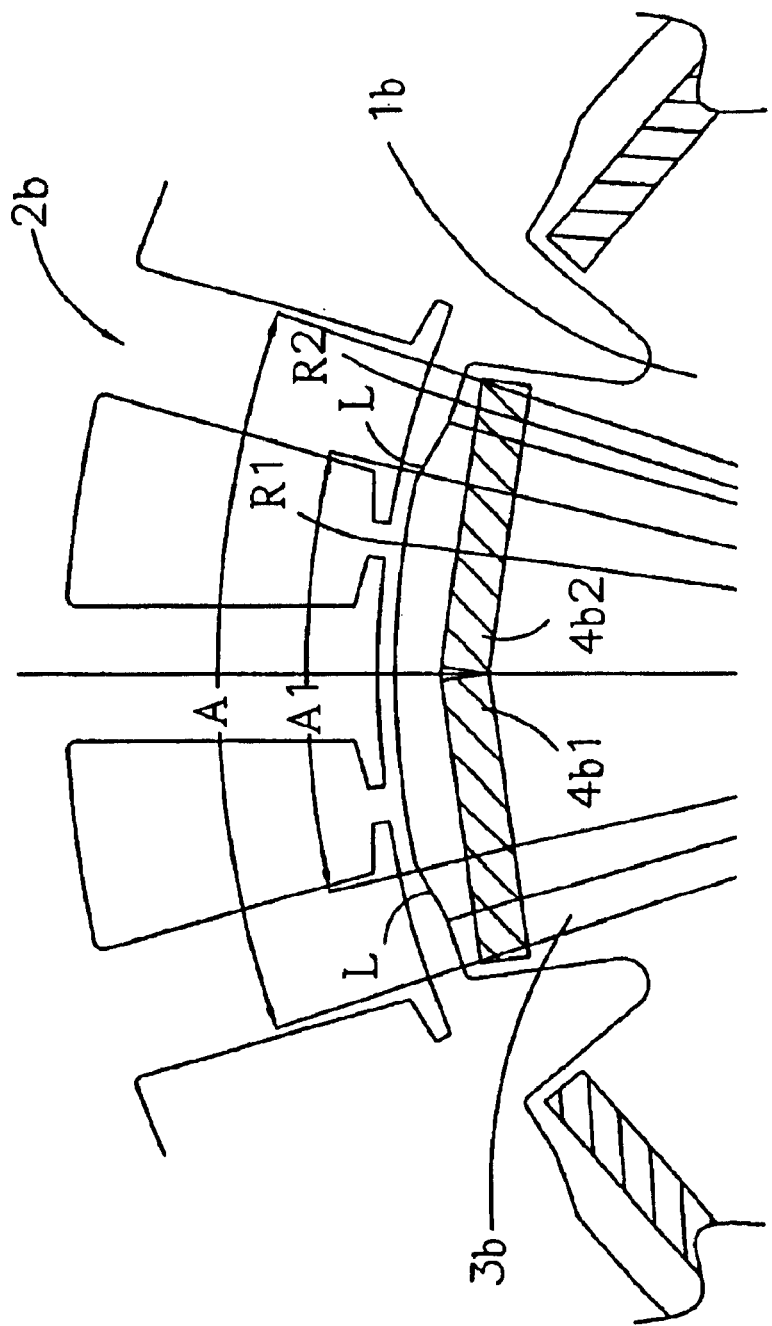
FIG. 1 is a schematic illustration of the permanent magnet rotor assembly for a brushless electric motor of the present invention.
Figure 5:
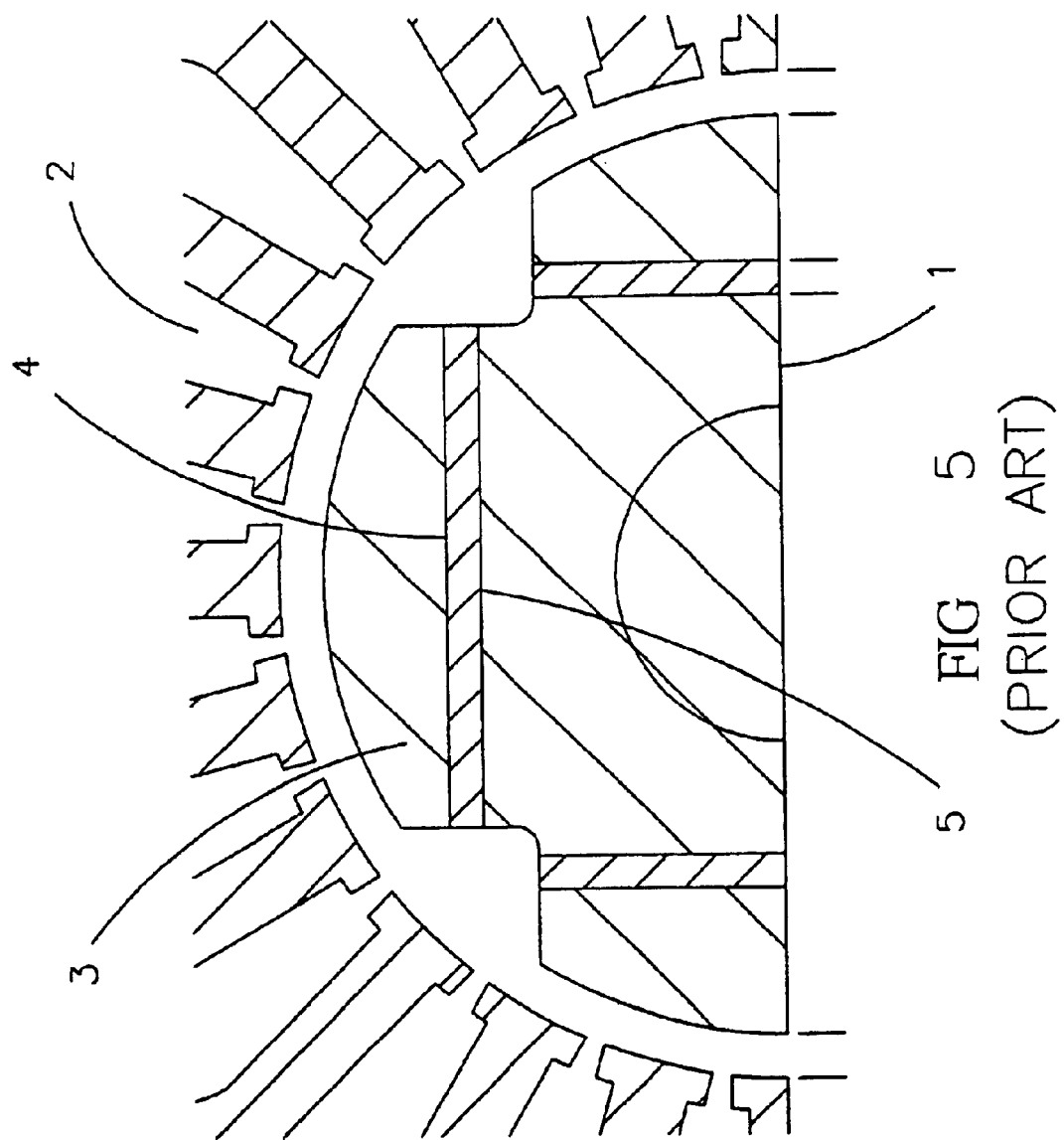
FIG. 5 (prior art) is a schematic illustration of a conventional stator and permanent magnet rotor of a brush less motor.
Figure 6:
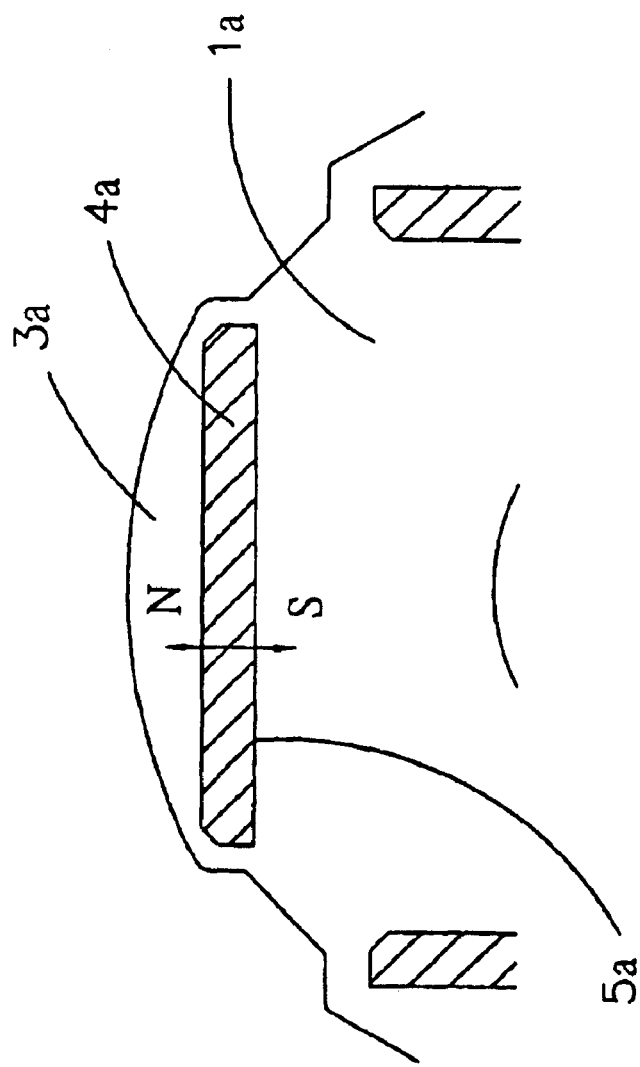
FIG. 6 (prior art) is a schematic illustration of another conventional permanent magnet rotor of a brush less motor.

The rotor permanent magnet rotor assembly for a brushless electric motor of the present invention improves on conventional art using a single-plate permanent magnet 4, as shown in FIG. 5, and a single-plate permanent magnet 4a, as shown in FIG. 6, by having a dual-plate permanent magnet composed of outward protruding plates 4b1, 4b2, as shown in FIG. 1. The rotor assembly of the present invention further comprises a rotor 1b, a stator 2b with a plurality of stator sections, and a plurality of main magnetic poles 3b. Each opening angle A covers N/2 times the opening angle of the stator sections, with N being an odd number greater or equal to 3. A is required to be the nearest angle that is smaller than 360/(P degrees, with P being the number of poles. For example, if there are 24 stator sections and 8 main magnetic poles, the opening angle A equals 37.5 degrees.

Each of the main magnetic poles has a periphery with a curved central section R1 and two curved end sections R2. R1 has a length that is larger than the lengths of each of the end sections R2. Straight transition sections L connect the central section R1 and the two end sections R2. R1 has an opening angle A1. The opening angle A1 covers N/2 times the opening angle of the stator sections, with N being an odd number greater or equal to 3. A1 is required to be smaller than A. If, for example, there are 24 stator sections and 8 main magnetic poles, so that the opening angle A covers 3 stator sections, being equal to 45 degrees, then the opening angle A1 equals (360/24/2)×3=22.5 degrees.

Determining the opening angles A, A1 reduces cogging torque. The curvature of the end segments R2 creates increased air gaps between stator and rotor, weakening the reaction field. Moreover, even the increased air gaps are uniform due to the rounded curvature of the end segments R2, so that, other than described in U.S. Pat. No. 6,047,460, magnetic flux through the main magnetic poles is not considerably reduced. Thus the reaction field between stator and rotor is weakened while magnetic flux through the main magnetic poles is maintained. Reaction field strengths at the segments R1 and R2 differ, with the straight transition segments providing for smooth transitions, furthermore the reaction field is reduced, and the rotor assembly of the present invention allows for bidirectional rotation.

Figure 2:
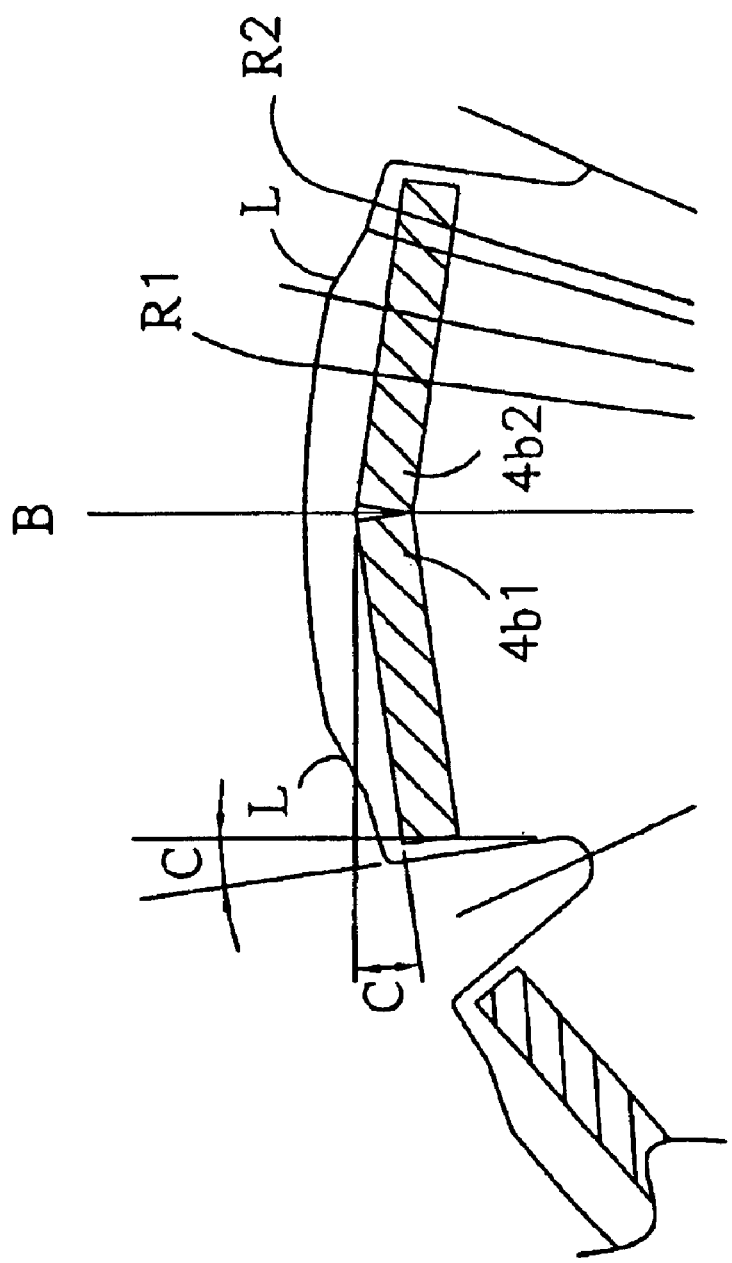
FIG. 2 is an enlarged schematic illustration of the rotor with an outward protruding permanent magnet of the present invention.
Figure 3:
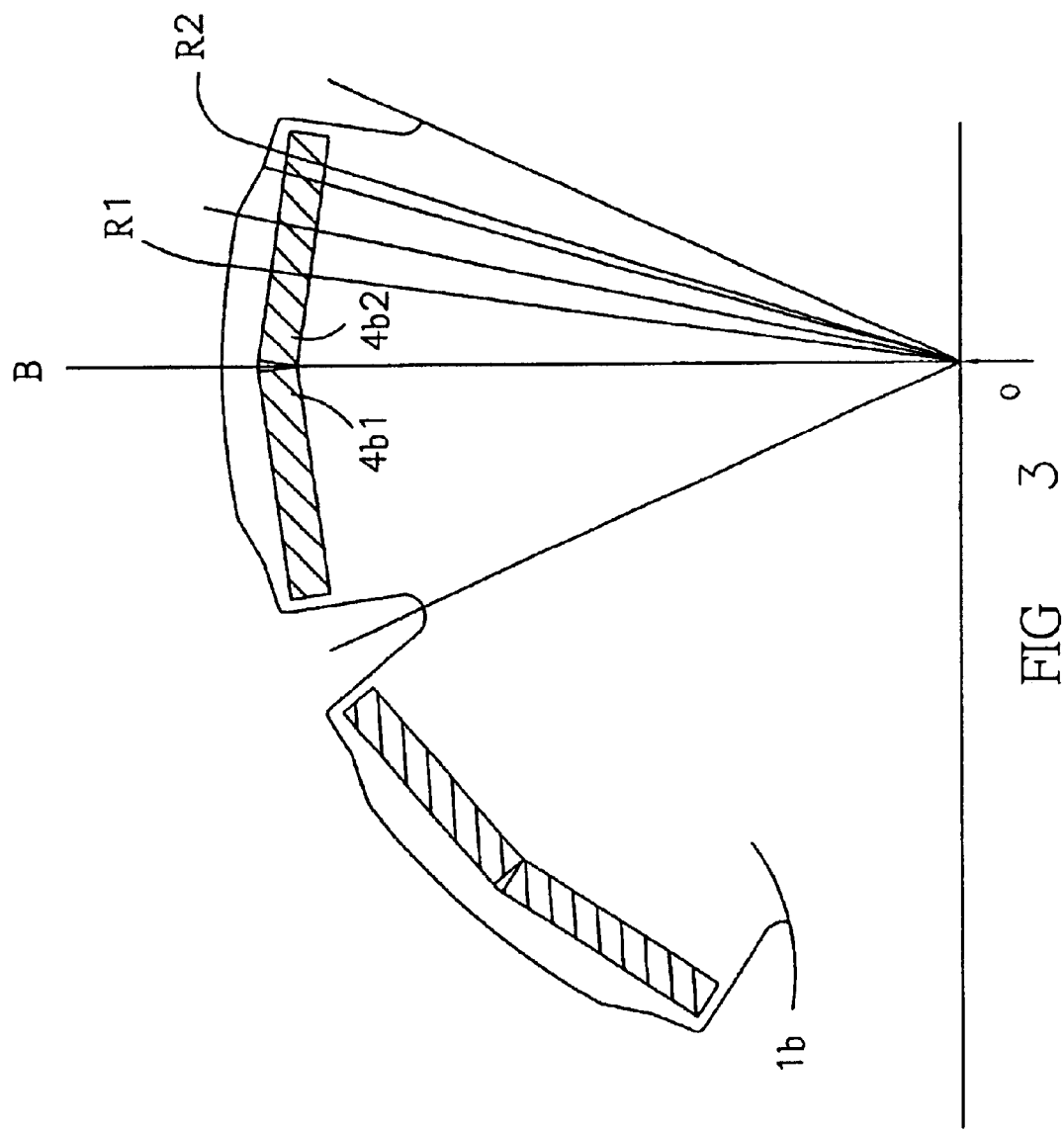
FIG. 3 is an enlarged schematic illustration of the rotor with an outward protruding permanent magnet of the present invention for increased magnetic flux and reduced reaction field and magnetic flux region.
Figure 4:
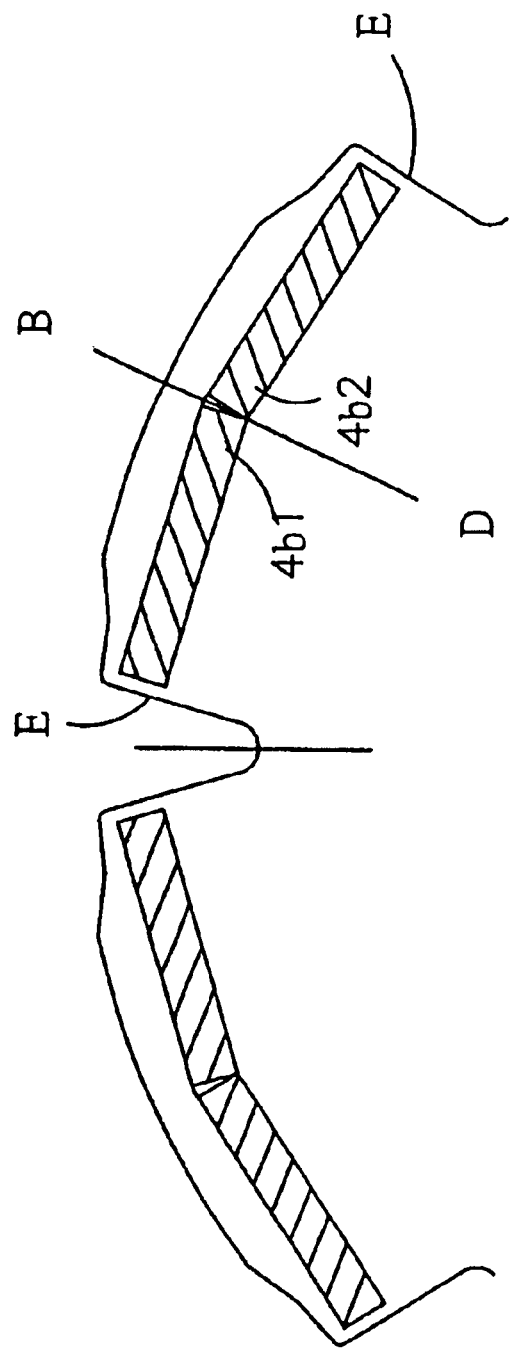
FIG. 4 is a schematic illustration of main magnetic poles with permanent magnets of the present invention, the outer edges thereof being parallelly oriented.
Figure 7:
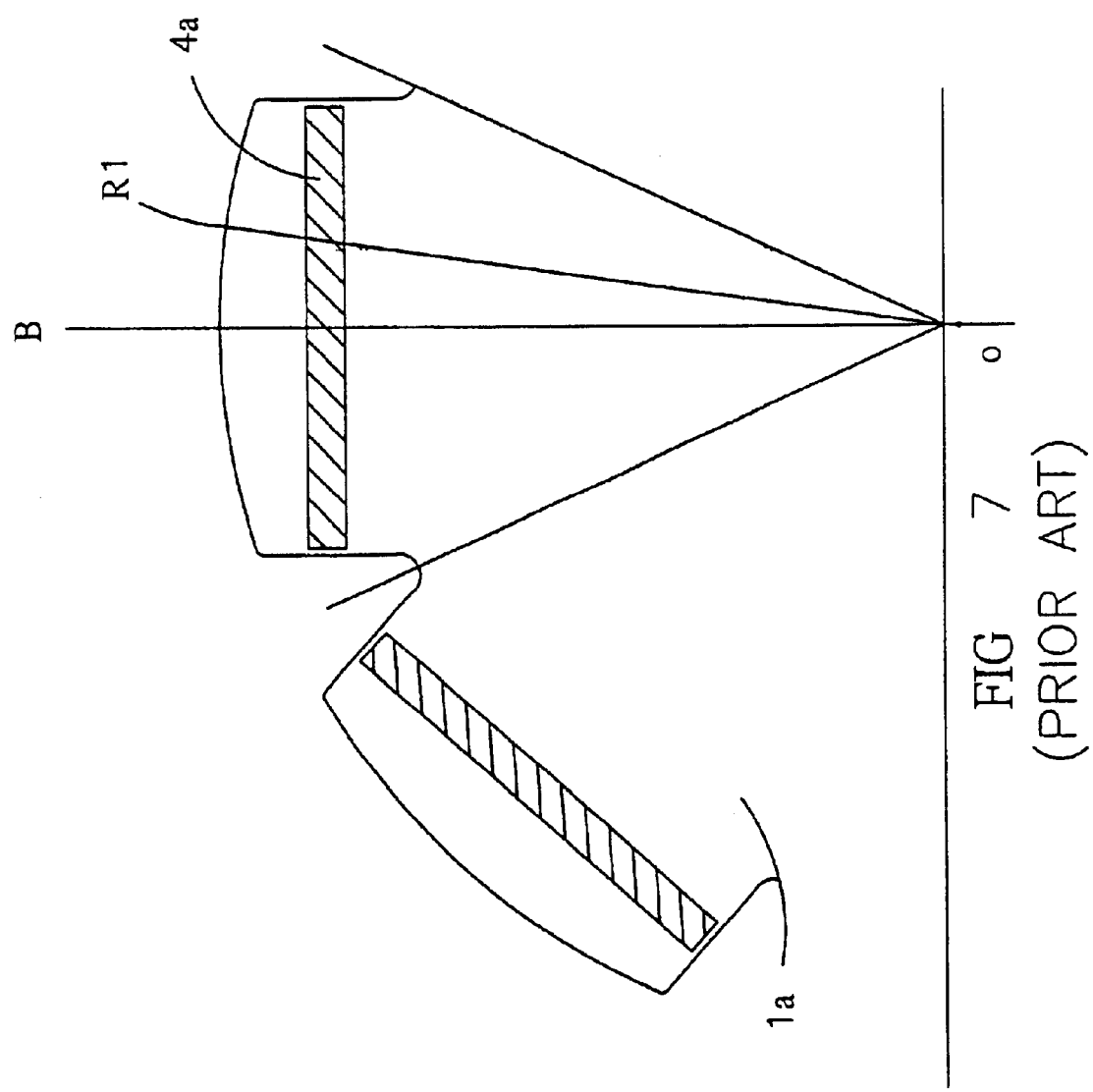
FIG. 7 (prior art) is a schematic illustration of a conventional sinale-plate permanent magnet.

To improve on another factor of the reaction field, that is, on the magnetic flux through the main magnetic poles, the rotor assembly of the present invention has an arrangement of permanent magnets that is changed as compared to conventional art, as taught in U.S. Pat. Nos. 5,844,344 and 6,047,460. As shown in FIGS. 1 and 2, a permanent magnet composed of two plates $4b1$, $4b2$ is substituted for the single-plate permanent magnets 4, $4a$ of conventional art. The plates $4b1$, $4b2$ have ends that are placed in central positions on the permanent magnet and protrude outward, being oriented at an angle C to a tangential plane. Thus the area of the permanent magnet is increased, increasing the flux through the permanent magnet. Furthermore, as shown in FIG. 3, the plates $4b1$, $4b2$ have a magnetic flux region that is reduced, as compared to conventional art shown in FIG. 7, so that resistance to the reaction field is increased and consequently the reaction field is reduced. Referring now to FIG. 4, for each permanent magnet, lateral rims E are not parallel to a central radial line DB, but to outer edges of the permanent magnet, so that spaces between the permanent magnets have greater depths in radial direction, resulting in higher differences of direct axis and quadrature axis inductances and thus in higher reluctance torque.

The present invention takes advantage of an outer curvature of the sections R1, R2, of adapting the opening angles of each main magnetic pole and the opening angle of the section R1 thereof, and of the outward protruding poles of the dual-plate permanent magnets each being oriented parallel to the outer edges of the permanent magnets to reduce the reaction field in stator coils, increase magnetic flux and increase output torque of the brushless motor, reducing cogging torque of the brushless motor and achieving a relatively large reluctance ratio. Therefore, the rotor assembly of the present invention is suitable for usage in electric vehicles or machines undergoing high loads, increasing efficiency thereof.

While the invention has been described with reference to a preferred embodiment thereof, it is to be understood that modifications or variations may be easily made without departing from the spirit of this invention which is defined by the appended claims.

What is claimed is:

1. A permanent magnet rotor assembly for a brushless electric motor, comprising:

at least two main magnetic poles, disposed on a periphery of a rotor, each of said at least two main magnetic poles having a mechanical opening angle A which covers N/2 times an angle of a stator segment, with N being an odd number that is greater than or equal to 3, so as to yield a closest value smaller than 360/P degrees, with P being the number of said at least two main magnetic poles, with each of said at least two main magnetic poles having a central section R1 and two end sections R2, with R1 having an opening angle A1 which covers N/2 times said angle of each of said stator sections, with N being an odd number greater or equal to 3, and A1 being smaller than said opening angle A; wherein each of said at least two main magnetic poles has a permanent magnet composed of two plates with two ends located in central positions and protruding outward.

2. The permanent magnet rotor assembly for a brushless electric motor according to claim 1, wherein for each of said at least two main magnetic poles, said central section and said end sections are connected by straight sections.

3. The permanent magnet rotor assembly for a brushless electric motor according to claim 1, wherein each of said at least two main magnetic poles has outer rims oriented parallel to outer edges of said permanent magnet thereof.

4. A permanent magnet rotor assembly for a brushless electric motor, comprising:

at least two main magnetic poles, disposed on a periphery of a rotor, each of said at least two main magnetic poles having an opening angle A which covers N/2 times an angle of a stator segment, with N being an odd number that is greater than or equal to 3, and that has a closest value smaller than 360/P degrees, with P being the number of said at least two main magnetic poles, with each of said at least two main magnetic poles having a central section R1 and two end sections R2, with R1 having an opening angle A1 which covers N/2 times said angle of each of said stator sections, with N being an odd number greater or equal to 3, and A1 being smaller than said opening angle A; wherein for each of said at least two main magnetic poles, said central section and said end sections are connected by straight sections.

5. The permanent magnet rotor assembly for a brushless electric motor according to claim 4, wherein each of said at least two main magnetic poles has a permanent magnet composed of two plates with two ends located in central positions and protruding outward.

6. The permanent magnet rotor assembly for a brushless electric motor according to claim 4, wherein each of said at least two main magnetic poles has outer rims.

* * * * *